INVENTOR.
ARTHUR B. EUGA
BY
Schmieding and Fultz
ATTORNEYS

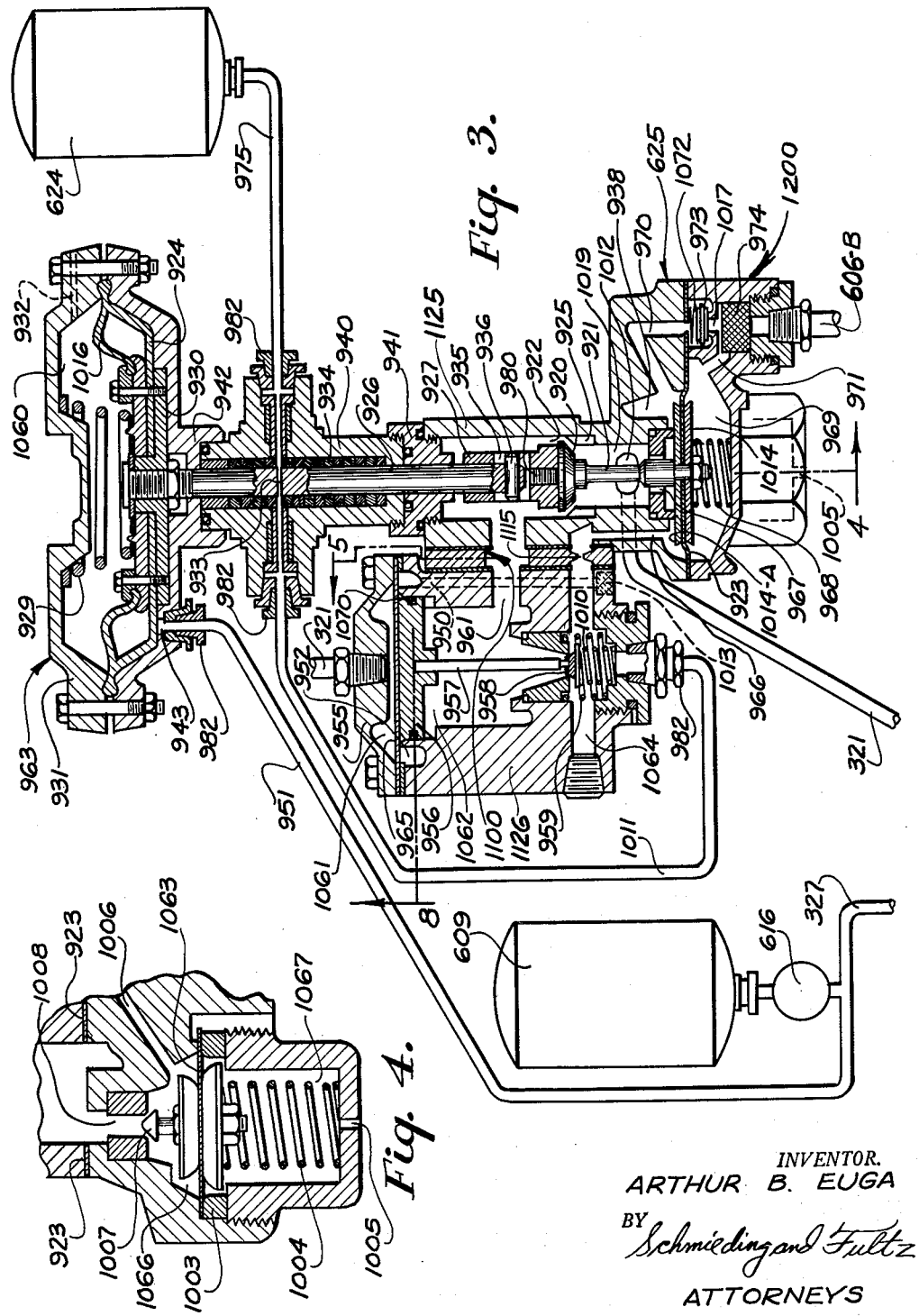

INVENTOR.
ARTHUR B. EUGA

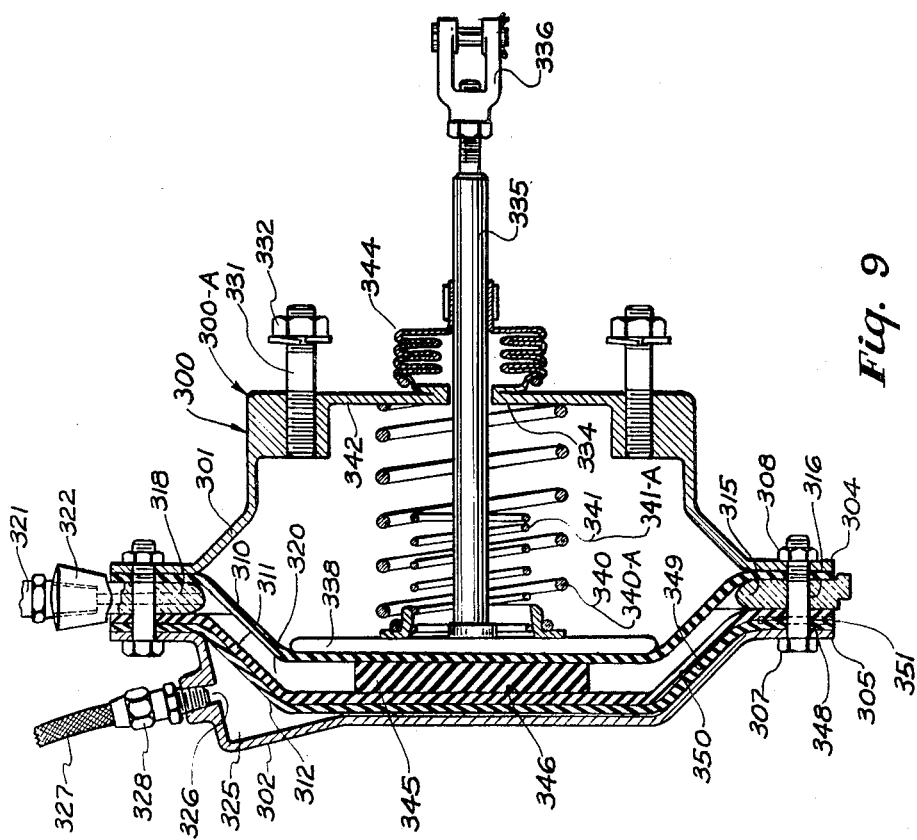

United States Patent Office 3,093,421
Patented June 11, 1963

3,093,421
LIMITING CONTROL FOR RELAY
EMERGENCY VALVE
Arthur B. Euga, 728½ Franklin Ave., Columbus, Ohio
Filed Dec. 10, 1957, Ser. No. 701,935
9 Claims. (Cl. 303—2)

The present invention releates to brake systems for vehicles and particularly to a novel relay emergency valve for such systems.

This application is a continuation-in-part of my co-pending application Serial Number 564,315 filed February 8, 1956, now Patent No. 2,871,827 which is in turn a continuation-in-part of my application Serial No. 176,785 filed July 31, 1950, now abandoned.

In general, air brake systems of the type used on tractor-trailer vehicles are provided with a relay emergency valve. Such valves serve two general functions in that during normal braking operations they release, at a controlled rate, air from a trailer air supply to the brake motors at the wheels of the trailer, and in an emergency situation serve to automatically apply the trailer brakes when the air pressure in the service system drops below a predetermined pressure value. Hence it will be understood that when the air lines running from the tractor to the trailer are ruptured, or in the event that the trailer breaks away, the trailer brakes are automatically applied for the purpose of bringing either the trailer or the combined vehicles to a stop.

In the emergency operation of such conventional relay emergency valves, prior to the present invention, a very dangerous characteristic has existed in that these conventional relay emergency valves, in automatically releasing air from the trailer supply, release such air suddenly at high volumetric rates of flow whereby full braking action is instantly applied. Hence the wheels on the trailers are suddenly locked with the result that the driver loses all control of the vehicle. Such uncontrolled stops frequently result in what is commonly terned a "jack-knife" stop and many deaths on the highways have resulted from such accidents.

Another serious type of accident has frequently been caused by the automatic emergency application of the trailer brakes in instances where heavy shiftable loads are carried on the trailer. It will be understood that when the trailer brakes are suddenly applied, with full braking effect, the inertia of a heavy shiftable cargo carries itself forward against the tractor with tremendous force, often demolishing the tractor and killing the driver.

In view of the above described existing problems, the present novel relay emergency valve has been developed for the purpose of making possible a gradual automatic application of the trailer brakes by releasing air, at a controlled rate, from the trailer air supply to the trailer brake motors. Moreover, the relay emergency valve of the present invention is provided with an adjustable flow rate control valve whereby the driver can selectively achieve, in accordance with the load he is hauling, various flow rates for the release of air to the trailer motors.

An additional important advantage is achieved by the relay emergency valve of the present invention in that it incorporates a novel mechanism for adapting the valve for use with an independent emergency brake system. Specifically, upon failure of the service air system, without a break-away of the trailer, the present novel mechanism renders inoperative the conventional automatic air release means in the relay emergency valve so that automatic and sudden locking of the trailer wheels is prevented and the driver can apply his independent emergency air system for its purpose of releasing air, at a controlled rate, from an emergency air supply to the brake motors of the trailer.

In addition to the above, when the driver is operating the emergency air supply system, and the trailer breaks away from the tractor, the novel relay emergency valve of the present invention includes mechanism that automatically and instantaneously renders operative the automatic air release means for releasing air from the service trailer air supply to the brake motors. Hence it will be understood that the automatic emergency stop feature, needed in all relay emergency valves, is first rendered inoperative to permit operation of the independent emergency brake system, and, moreover, its operativeness is instantaneously restored should a break-away situation occur requiring its operation.

It is therefore an object of the present invention to provide a novel relay emergency valve which is adapted to make automatic emergency brake applications such that the braking effect is applied smoothly with gradually increasing magnitude.

It is another object of the present invention to provide a novel relay emergency valve which includes an adjustable flow rate controller whereby the driver can select various volumetric flow rates, depending upon the load he is carrying, for the flow of air during an automatic emergency stop.

It is another object of the present invention to provide a novel relay emergency valve which can be used on vehicles that incorporate both a service brake system and a completely independent auxiliary brake system for the trailer brakes of a vehicle.

It is another object of the present invention to provide a novel relay emergency valve which, in the event of failure of the service brake system of the vehicle, permits the driver to utilize the remaining independent emergency brake system with the same convenience and efficiency that was present prior to the breakdown. Hence costly delays are eliminated and trucking schedules can be maintained.

It is another object of the present invention to provide a novel attachment for converting conventional relay emergency valves, of the type presently on vehicles now on the roads, so that such converted conventional valves incorporate the various features of the present invention whereby all the above described advantages are achieved with a minimum of expense.

It is still another object of the present invention to provide an improved brake system that functions to apply braking action first to the rearmost vehicle and which maintains a differential in the magnitude of the braking effect in favor of the rearmost vehicle throughout the braking cycle.

Further objects and advantages of the present invention will be apparent from the following description, reference being had to the accompanying drawings wherein a preferred form of embodiment of the invention is clearly shown.

In the drawing:

FIGURE 3 is a side sectional view of a novel relay emergency valve constructed according to the present invention, the section being taken along a vertical plane through the center line of the apparatus of the present invention;

FIGURE 4 is a sectional view of a portion of the relay emergency valve of FIGURE 3, the section being taken along the line 4—4 of FIGURE 3;

FIGURE 9 is a side sectional view of a brake motor comprising a portion of the brake systems of FIGURES 2 and 3, the section being taken along a vertical plane through the center of the brake motor.

Figure 2:
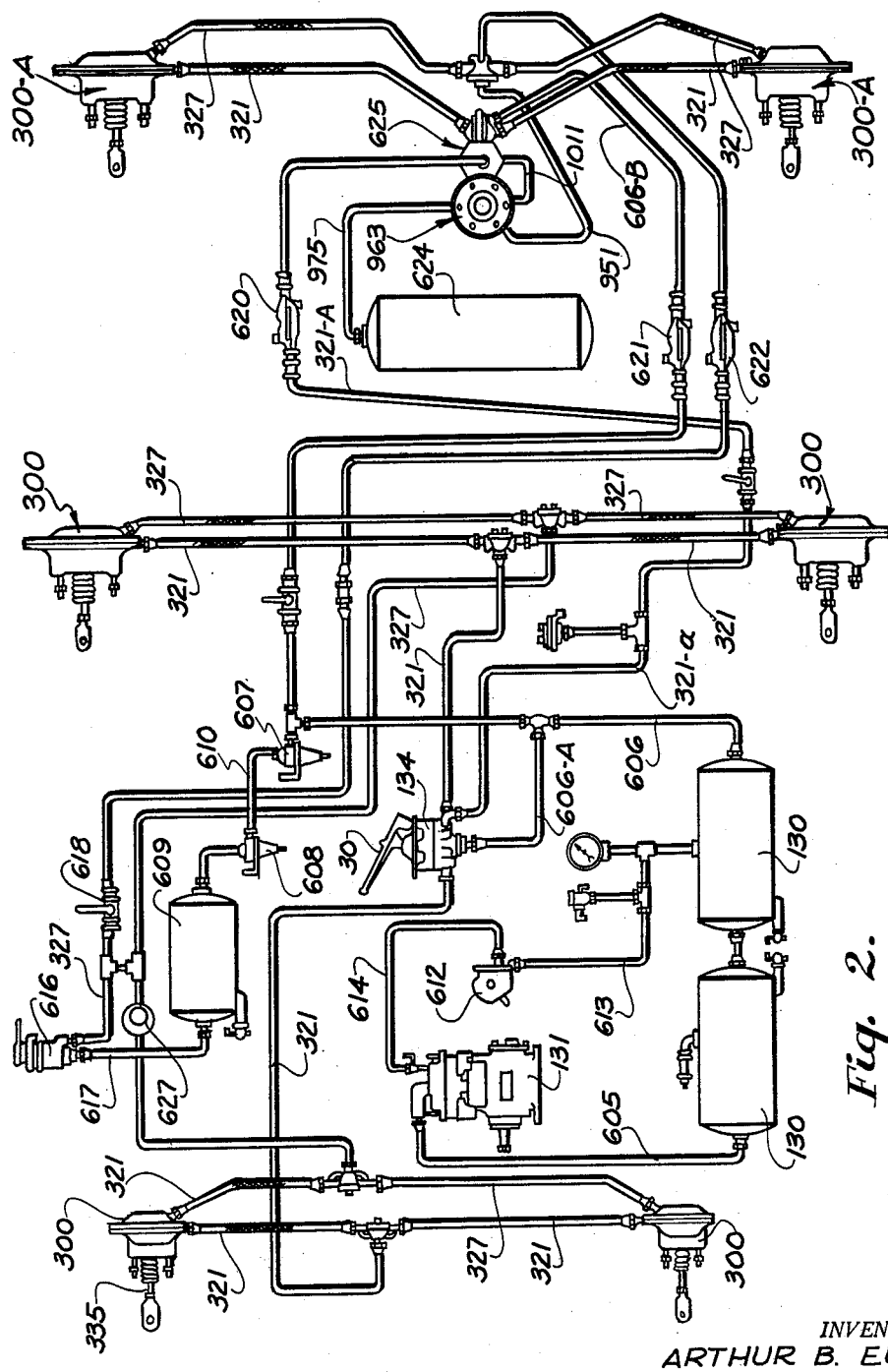
FIGURE 2 is a schematic view of a typical brake system provided with a relay emergency valve constructed according to the present invention.

Referring in detail to the drawing, FIGURE 2 illustrates an air brake system of the type disclosed in FIGURE 25 of my Patent No. 2,871,827, which system incorporates both a service system and an independent emergency system. The present system of FIGURE 2, however, is different in that it includes a novel relay emergency valve 625 and associated emergency release cut-out mechanism 963, said valve and mechanism being constructed according to the present invention. In addition, the present system of FIGURE 2 differs in that it includes a novel air motor return spring arrangement to be described in detail later herein.

As is illustrated in FIGURE 2, the present system comprises a compressor 131 that supplies air through line 605 to service reservoir 130. Air from service reservoir 130 passes through line 606 to first pressure regulator valve 607. When the pressure in service reservoir 130 and line 606 reaches a predetermined value, such as 40 p.s.i., regulator valve 607 opens and air passes through a second pressure regulator valve 608 to an auxiliary reservoir 609.

Second pressure regulator valve 608 is adapted to be opened by a lesser air pressure, such as 15 p.s.i., whereby air will readily pass through such second pressure regulator valve 608.

Both the pressure regulator valves 607 and 608 are well known to the art and are a type of valve which permits air to flow only in one direction, and only when the pressure reaches some minimum predetermined value at which the valve is opened by air pressure.

It should be pointed out that the maximum operating pressure of auxiliary reservoir 609 is maintained, during normal operation, at a pressure value of approximately 15 p.s.i. less than the maximum feeding pressure from service reservoir 130. This is achieved by selecting the proper spring force for the spring in valve 608. For example, if the feeding pressure in service reservoir 130 is 105 p.s.i. the pressure in auxiliary reservoir 609 will be 90 p.s.i.

The two pressure regulator valves 607 and 608 are connected by a conduit 610. Two valves are provided so that if one of the valves 607 or 608 ruptures, both of the reservoirs 130 and 609 will not drain to atmosphere. For example, if only valve 607 should rupture, only service reservoir 130 is lost to atmosphere, or if only valve 608 ruptures, only auxiliary reservoir 609 is lost to atmosphere.

When the desired operating pressure is reached in the reservoirs, a governor 612, of a conventional type well known to the art, senses such operating pressure and vents the line 614 which in turn operates a valve in the compressor that prevents the compressor 131, which is continuously driven, from continuing to pressurize the reservoirs.

Assuming both reservoirs 130 and 609 are fully charged with air, in the manner previously described, normal braking action is effected by depressing pedal lever 30 which lever actuates brake valve 134 to release air from service reservoir 130 through lines 321 to the various service brake chambers of brake cylinders 300.

Brake valve 134 is of a conventional type, well known to the art, and functions to meter air to the service brake chambers at a controlled rate.

In the event service brake valve 134 is actuated, with a failure in pressure availability in service brake circuit, a hand operated brake valve 616 is actuated to release air from auxiliary reservoir 609, through line 617, valve 616, and lines 327 to the auxiliary chambers of air brake cylinders 300 and 300–A.

It will be noted in FIGURE 2, that a manually operated shut-off valve 618 is provided in line 327 leading to the brake cylinders of the trailer or trailers being towed by the tractor. Valve 618 is mounted in the cab of the tractor within reach of the driver so that in the event a trailer or trailers should break away from the tractor, and sever the lines between the tractor and trailer, which are shown coupled at 620, 621, and 622, then, in that event the driver can conserve his air supply in auxiliary reservoir 609 by closing the previously mentioned shut-off valve 618.

With continued reference to FIGURE 2, the trailer circuit shown to the right of couplings 620, 621, and 622 includes a trailer reservoir 624. Line 606–B of the trailer circuit is always charged with reservoir pressure and connects to an emergency relay valve 625, later to be described in detail. In general, relay emergency valve 625 feeds air to trailer reservoir 624 and further serves the function of releasing air through lines 321 to the service chambers of the trailer brake cylinders 300–N when the trailer service line 620 is energized by pedal lever 30. In the event of a trailer break-away, or line failure for other reasons, emergency relay valve 625 serves the additional function of automatically releasing air from trailer reservoir 624 through line 321 to the service chambers of trailer brake cylinders 300–A. In the event of a line failure a check valve port in valve 625 communicating with line 606–B is automatically closed to prevent loss of air from trailer reservoir 624.

As seen in FIGURE 2, line 327 leading to the front axle brake cylinders 300 is provided with front axle limiting valve 627 for proportionally decreasing the air pressure applied to the front brake cylinders when the auxiliary brake system is energized. Pressure limiting valve 627 is located in the cab of the tractor whereby the driver can manually set same to various proportional settings. Hence the driver is able to control the relative braking effect applied at the front axle of the tractor as compared to the braking effect applied at the rear axle of the tractor when the emergency hand valve 616 is actuated.

Each of the brake cylinders 300 and 300–A of FIGURE 2 includes a brake actuating rod 335 which is connected to a conventional slack adjuster. The slack adjuster in turn operates a conventional cam rod which actuates the brake shoes of the vehicle.

FIGURE 9 illustrates a cylinder, indicated generally at 300 and 300–A, which cylinder includes a forward casing portion 301 and a rear casing portion 302 provided with peripheral flange portions 304 and 305, respectively, joined together by a plurality of threaded elements 307 and 308. Cylinder 300 includes a first flexible diaphragm 310, a second flexible diaphragm 311 and a third flexible diaphragm 312 clamped between the flange portions 304 and 305. An annular spacer member 315, disposed between diaphragms 310 and 311 is provided with a plurality of holes 316 through which bolts 307 are extended. Annular spacer member 315 includes a radially extending passage 318 communicating with a first sealed chamber 320. A line 321 connects passage 318 of spacer member 315 at a threaded fitting 322. Cylinder 300 includes a second sealed chamber 325 provided with a fluid intake opening 326 communicating with a fluid line 327 at a threaded fitting 328.

The two adjacently disposed diaphragms 311 and 312 form a double flexible wall means separating sealed chamber 320 from sealed chamber 325. It will be understood that chamber 320 can be connected with a service brake fluid circuit of the braking system and chamber 325 can be connected with a fluid circuit of the auxiliary braking system whereby chamber 320 becomes the service brake chamber and chamber 325 becomes the auxiliary brake chamber. These connections can be interchanged so that chamber 320 will function as an auxiliary brake chamber and chamber 325 will function as a service brake chamber.

The forward casing portion 301 of cylinder 300 is provided with studs 331 and nuts 332 for securing the cylinder to the vehicle. The forward casing portion 301 includes a hole 334 through which is extended a brake actuating rod 335 provided with suitable means, such as clevis 336, for connecting rod 335 to a slack adjustor and cams, not illustrated, for operating the brake shoes of the vehicle. The inner end of brake actuating rod 335 carries a plate element 338 which is contacted by a substantial portion of the area of flexible diaphragm 310. Compression springs 340 and 341 are disposed between plate element 338 and an inner surface 342 of the casing for urging the plate element 338 and diaphragm to the rearward position illustrated in FIGURE 9. A flexible boot 344 is provided at the junction of actuating rod 335 and casing portion 301 to serve as a dirt seal for hole 334.

With continued reference to FIGURE 9, a spacer member 345 is shown disposed between diaphragms 310 and 311 with such spacer member being secured to one of the confronting surfaces of the diaphragms such as the surface 346. Spacer member 345 is preferably formed of the same material as the flexible diaphragms, such as synthetic rubber, and provides means for transmitting force from rear flexible diaphragms 311 and 312 to plate element 338 and actuating rod 335 when chamber 325 is pressured.

According to the present invention, brake cylinders 300 of the towing vehicle differ from brake cylinders 300–A of the trailing vehicle in one important aspect. Specifically, springs 340 and 341, FIGURE 9, in the cylinders 300 on the towing vehicle are stronger and preferably longer, by a predetermined selected amount, than the springs 340–A and 341–A of the trailing vehicle. This force differential causes the brakes on the rear axle of the trailing vehicle to be first applied prior to the application of the brakes on the towing vehicle and, in addition, maintains a slightly greater braking action at the rear axle of the trailer throughout the entire time braking action is being increased or maintained. When braking action is being released, however, the differential in force between springs 340 and 341 and springs 340–A and 341–A causes a lesser application of braking pressure at the brakes on the towing vehicle as compared to the braking pressure being applied at the brakes on the trailing vehicle.

It will be understood that the above described differential in return spring force produces a novel differential braking action that prevents jack-knife type of accidents and maintains the vehicles under complete control of the driver at all times. It has been found that springs 340 and 341 on the towing vehicle should be stronger than springs 340–A and 341–A by a spring force differential that reduces the effective braking force at the wheels on the towing vehicle by a braking force approximately equal to 5 to 10 p.s.i. air pressure on a diaphragm of conventional size. Hence it will be understood that although air is released to cylinders 300 and 300–A at the same pressure the effective braking forces and the times at which the forces are instituted will differ between the respective cylinders. It should be further pointed out that merely choosing cylinders of smaller diaphragm area for the towing vehicle will not achieve the above described results produced by the differential in spring force since a differential in diaphragm areas will not achieve the important time lag between the respective brake applications on the towing and towed vehicle.

Figure 1:
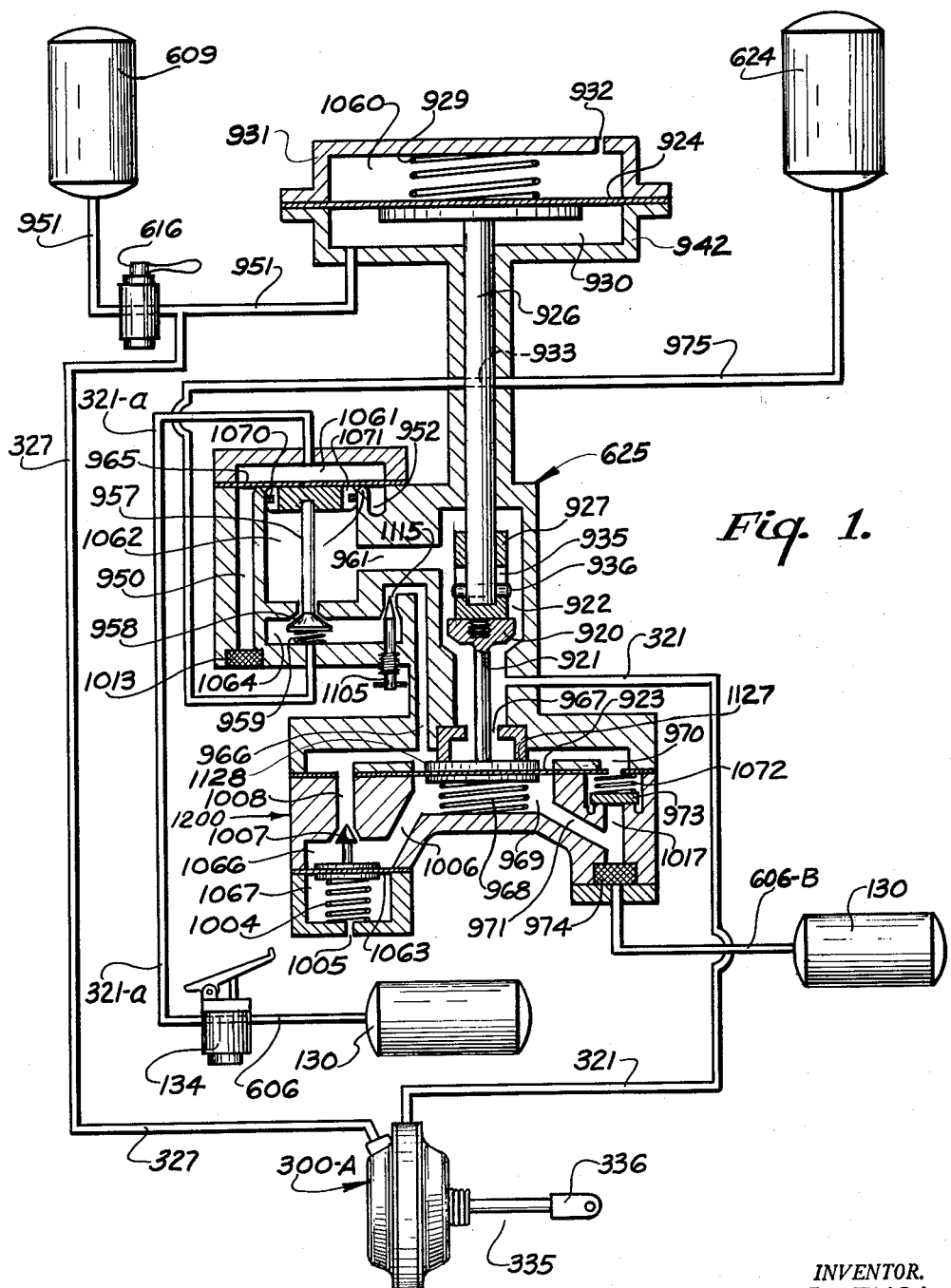
FIGURE 1 is a schematic view, partially in section, of a relay emergency valve and associated components of a brake system constructed according to the present invention.

Reference is next made to FIGURES 1, 3, 4, and 5 through 8 for the purpose of describing the novel relay emergency valve 625 of the present invention. FIGURE 3 illustrates the actual construction of a preferred form of the invention. FIGURE 1 should be considered only as a diagrammatic view which greatly facilitates the understanding of the operation of the various components of the mechanism of FIGURE 3.

In FIGURE 3 a conventional Bendix Westinghouse type RE–1C relay emergency valve has been provided with an adapter mechanism whereby the valve is caused to function in accordance with the present invention. It will be understood that by using such an adapter mechanism the present invention can be easily and inexpensively applied to the majority of vehicles presently on the road.

The adapter mechanism of the present invention is indicated generally at 963 in FIGURE 3 and consists of plug 941 and all the parts of the mechanism mounted on valve casing 1125 by the addition of such plug 941 which is screwed into a hole in the top of casing 1125 that normally contains a closure plug. In addition, the adapter mechanism includes a lost motion connector nut 927 which is screwed onto a stud 980 on a conventional emergency valve 920 normally present in production unit. In addition, the adapter mechanism includes an airflow control plate 1100 which is added to the conventional unit between casings 1125 and 1126 as illustrated in FIGURE 3 and later described in detail herein.

Referring first to the schematic system of FIGURE 1, various air supply reservoirs previously described in connection with the over-all system of FIGURE 2, are schematically represented at 130, 624, and 609. It will be understood that the two service tanks forming service reservoir 130 can be interconnected as shown in FIGURE 2. In normal braking operations air is released from service reservoir 130 by actuation of service brake valve 134. When the pedal of valve 134 is depressed air from the service air supply on the tractor is released through lines 606, valve 134, line 321–A, to a chamber 1061 above diaphragm 965 in the relay portion of the relay emergency valve 625. Pressurization of chamber 1061 urges trailer service valve 958 downwardly away from its seat whereby air is released from trailer service reservoir 624 through line 975, chamber 1064, chamber 1062, passage 961, chamber 922, and line 321 to the service air chamber of brake cylinder 300–A of the trailer. Such service air chamber is illustrated at 320 in FIGURE 9.

To release application of the service air chamber 320, FIGURE 9, of the trailer brake, pressure on the pedal of service brake valve 134 is decreased which causes a drop in pressure in chamber 1061 above diaphragm 965. The existing braking pressure in chamber 1062 then urges diaphragm 965 upwardly and air escapes through passages 1071 in diaphragm guide and ring assembly 1070. Passages 1071 may best be seen in FIGURE 8. The air then passes between the under surface of diaphragm 965 and annular shoulder 964, FIGURE 1. The air then passes through annular passage 952, passage 950, and filter 1013 to atmosphere.

It should be pointed out that trailer reservoir 624, FIGURE 1, is charged with air from tractor reservoir 130 via line 606–B, filter 974, passage 1017, chamber 969, passage 1006, pressure regulator valve 1007, passage 1008, chamber 970, passage 966, orifice 1115, chamber 1064, and line 975 to trailer reservoir 624. It should be pointed out that in charging trailer reservoir 624 from service reservoir 130 pressure regulator valve 1007 is urged closed by spring 1004 and check valve 973 is opened by air pressure until the pressure in chamber 1066 reaches 70 p.s.i. at which time valve 1007 opens and spring 1072 closes check valve 973. Hence it will be understood that during normal operation trailer reservoir receives air from service reservoir 130 through pressure regulator valve 1007.

The present novel relay emergency valve 625, like prior valves, is adapted to serve its function of automatically applying the trailer brakes upon drop of the service air pressure to below 70 p.s.i. as would occur if the trailer breaks away and ruptures line 606–B, FIGURES 1 and 2. Upon such loss of service air and drop in pressure to below 70 p.s.i. pressure regulator valve 1007 is closed by the force of spring 1004. Hence the pressure in chamber 970 above diaphragm 923 will be greater than the pressure in chamber 969 below diaphragm 923 and diaphragm 923 moves downwardly causing seal 1128 to be moved away from sealed engagement with annular shoulder 1127.

In the event line 321–A, FIGURES 1 and 2, is also ruptured, along with line 606–B, as will happen when the trailer breaks away from the tractor, then the pressure in chamber 1061 is lost whereby spring 959 closes valve 958. Hence air from trailer reservoir 624 is released from tractor reservoir 624 via line 975, passage 933, chamber 1064, orifice 1115, passage 966, under annular shoulder 1127, chamber 967, and through line 321 to the service air chamber 320, FIGURE 9, of trailer brake cylinder 300–A.

The above described automatic emergency release of air from trailer service reservoir 624 is effected at a gradual controlled rate due to the presence of throttle valve 1105, FIGURES 1, 5, 6, and 7 at orifice 1115. Hence when a break away occurs causing the emergency actuation just described, the flow of air is retarded so that the service air chambers 320 are charged at a gradual controlled rate. By manually adjusting throttle valve 1105 the driver can selectively vary the size of orifice 1115 and obtain any desired rate of emergency application depending on the load he is hauling. If a heavy shiftable load is being carried, it is desirable to adjust throttle valve 1105 to reduce the area of orifice 1115 so that the emergency application will be gradual. If a lighter or less dangerous load is being hauled the size of orifice 1115 can be increased whereby the application of braking effect will be more rapid.

It should be pointed out that throttle valve 1105 does not effect the normal service braking operation since, as previously described, air is normally released through trailer service valve 958 instead of emergency air course 966, the latter being utilized only during automatic emergency actuation, and for conveying air from tank 130 to tank 624.

It should next be emphasized that the above described automatic emergency operation is in many instances undesirable. With conventional relay emergency valves once this automatic emergency actuation is instituted the driver of the truck has no control over preventing or modifying the braking effect which is being automatically applied. The relay emergency valve 625 of the present invention, however, includes novel mechanism whereby the driver can instantly regain braking control after an automatic emergency actuation has started. Such mechanism comprises a diaphragm chamber 930 formed by an upper casing portion 931, a lower casing portion 942, and a diaphragm 924, which provide power means for closing passage 933 in line 975 whereby the release of trailer service air is stopped. Moreover, actuation of diaphragm 924 opens emergency valve 920 to vent the service chamber 320 of trailer brake cylinders 300–A.

With continued reference to FIGURE 1, when the driver desires to regain control, after an automatic emergency operation has started, he can quickly and easily do so by opening emergency valve 616. This pressurizes a chamber 930 or fluid motor 931 under diaphragm 924 by releasing air through line 951 and valve 616 to chamber 930. Diaphragm 924 is thereby moved upwardly and such upward movement serves two separate functions. First, passage 933 through rod 926 is moved out of alignment with line 975 whereby release of air from trailer service reservoir 624 is terminated. Secondly, pin 936 on the bottom of rod or actuator 926 is moved upwardly in lost motion spot 935 and into engagement with the top of the slot. This action lifts valve 920 away from its seat. Opening of valve 920 releases the service air which is present in the service brake chambers 320 of brake cylinder 300–A via line 321, passage 922, passage 961, chamber 1062, passages 1071, between diaphragm 965 and shoulder 964, annular passage 952, passage 950, and air filter 1013 to atmosphere.

The lost motion connection at pin 936 and slot 935 is provided since the travel of valve 920 is less than the travel of rod 926 required to close passage 933.

It will be understood that when the previously described automatic emergency operation has started, diaphragm 923 is urged downwardly by a force produced by the loss of air pressure in chamber 969 and the presence of air pressure in chamber 970. In order to raise diaphragm 924 and rod 926 it is necessary to overcome such downwardly exerted force on diaphragm 923. For most types of emergency situations it is desirable to be able to lift rod 926 by releasing approximately only one third of the available pressure to chamber 930 by actuation of emergency valve 616. Since emergency air is also released to auxiliary chambers 325 of brake cylinders 300–A, FIGURE 9, the driver does not want to be forced to use more than one third of his total available auxiliary air pressure to actuate diaphragm 924 since if excessive air pressure were required the brakes would be suddenly locked. The area of diaphragm 924 is selectively established, in proportion to the area of diaphragm 923, such that the service chamber pressure existing on top of diaphragm 923, caused by initiation of the automatic emergency release, is overcome by a pressure under diaphragm 924 of approximately one-third the magnitude of the maximum pressure that could ever be present in chamber 970 above diaphragm 923. Hence if an emergency occurs when the pressure in chamber 970 is at a maximum, such as 105 p.s.i., due to a high existing pressure in trailer service reservoir 624, and if at the same time the pressure in auxiliary reservoir 609 happens to be extremely low, say 40 p.s.i., then in that event the lower pressure on large diaphragm 924 will overcome the higher pressure exerted on small diaphragm 923. It will be understood that the above described differential in diaphragm areas is necessitated because it takes a certain amount of time for the driver to actuate the auxiliary brake valve 616 whereby a certain amount of pressure will build up in chamber 970 after the automatic emergency action has started.

After the emergency air charge has been vented from the service brake chambers 320 of brake cylinders 300–A, as previously described, the driver can move valve 616 towards the closed position leaving about 5 p.s.i. of air pressure in chamber 930 to overcome the force of spring 929 whereby passage 933 is maintained out of alignment with line 975 and valve 920 is maintained away from its seat.

The automatic emergency actuation having been cut out, the driver can controllably apply braking action with valve 616 to release air from auxiliary reservoir 609, FIGURE 1, via line 951, auxiliary brake valve 616, line 327, to auxiliary brake chamber 325, FIGURE 9, of trailer brake cylinder 300–A. The driver can now proceed to a location of safety. For example, he may have been stalled on a railroad track due to emergency actuation of his braking system. After he has arrived at a location of safety, he can get out of the vehicle and completely close throttle valve 1105 through which the emergency release of air must pass. This enables him to temporarily prevent the recurrence of automatic relay emergency brake applications since any time an automatic emergency application occurs valve 958 is closed whereby emergency air from trailer reservoir 624 cannot pass through closed orifice 1115 and hence is prevented from passing to service brake chamber 320 of brake cylinder 300–A, FIGURE 9.

After closing throttle valve 1105 the driver can proceed to his destination using his auxiliary brake system in the manner of a service brake. It will be necessary for him to proceed with caution since the vehicle will then have only one effective brake system on the trailer. The towing vehicle, however, will still have both an operative service system and an operative auxiliary system.

It should be pointed out that the system of the present invention is adapted for use with the various brake cylinder constructions disclosed in my Patent No. 2,871,827 and in my Patent No. 3,011,832. These patents disclose brake cylinders wherein the service brake chamber and the auxiliary brake chamber are provided with two or more diaphragms with a vent means for the intermediate space between the diaphragms. These constructions are particularly safe since the loss of any diaphragm will not cause the loss of either the service or the auxiliary brake system.

Figure 5:
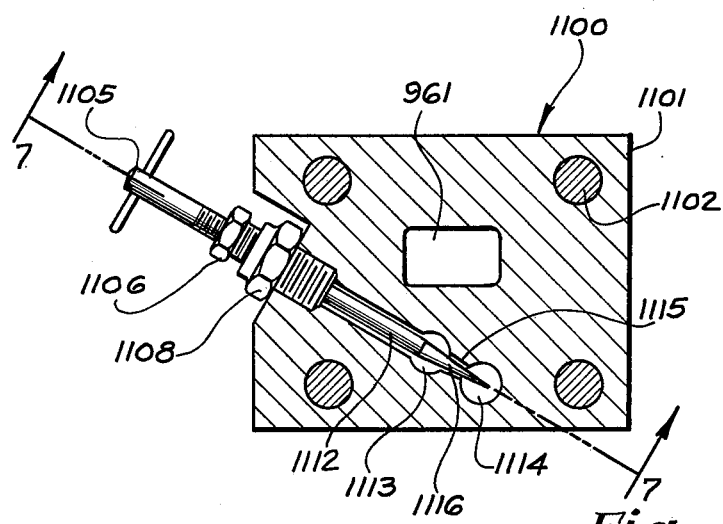
FIGURE 5 is a sectional view of an air flow control plate comprising a portion of the apparatus of FIGURE 3, the section being taken along the line 5—5 of FIGURE 3.
Figure 6:
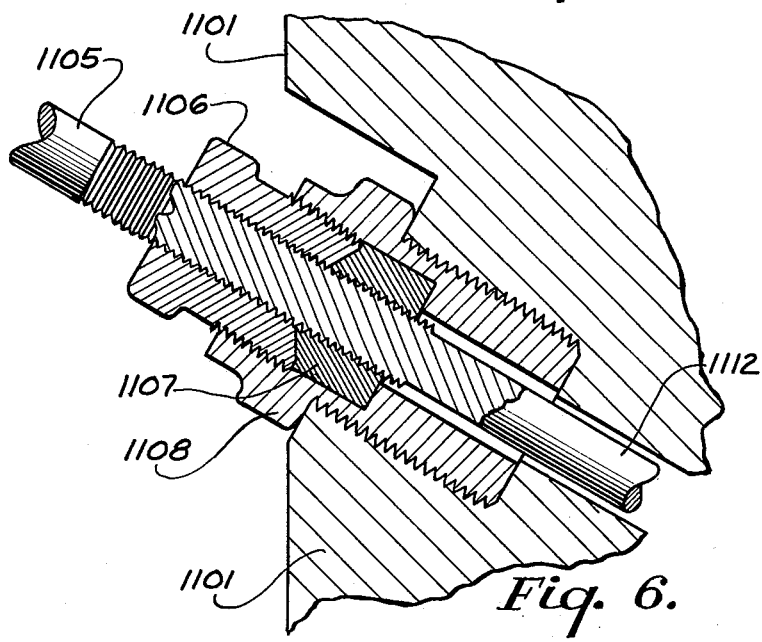
FIGURE 6 is a partial sectional view of a needle valve comprising a portion of the air flow control plate of FIGURE 5, the section being taken along the center line of said needle valve.
Figure 7:
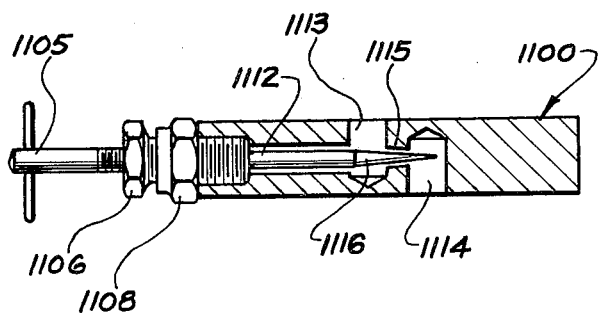
FIGURE 7 is a second sectional view of the air flow control plate of FIGURE 5; the section being taken along the line 7—7 of FIGURE 5.
Figure 8:
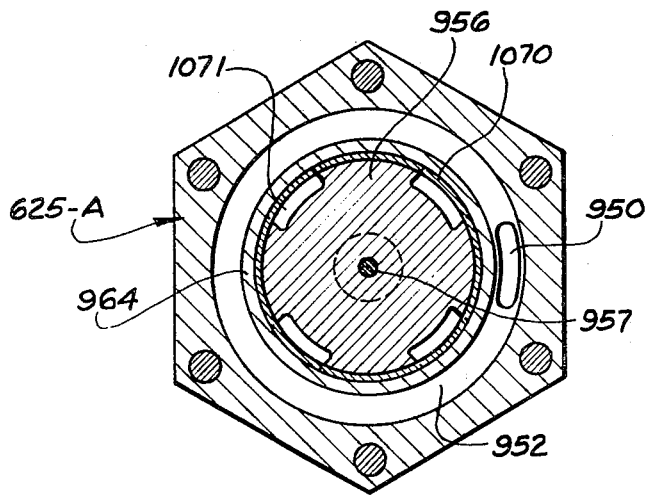
FIGURE 8 is a sectional view of a relay portion of the relay valve of FIGURE 3, the section being taken along the line 8—8 of FIGURE 3.

FIGURES 5 through 7 illustrate, in detail, a novel air flow control plate 1100 which comprises a portion of the attachment mechanism of the present invention and which can be readily installed in a conventional relay emergency valve. Such air flow control plate 1100 is positioned between casing portions 1125 and 1126 as illustrated in FIGURE 3. An emergency air passage through the plate is formed by drilling blind holes 1113 and 1114 which are interconnected by orifice 1115, FIGURES 5–7. A service air passage 961 is formed through plate 1100 for the passage of air from chamber 1062 to chamber 922. A plurality of bolts through holes 1102, FIGURE 5, clamp plate 1100, and gaskets therefor, between the two casing portions 1125 and 1126, FIGURE 3.

Throttle valve 1105 is rotatably carried by fitting 1108 and provided with a lock nut 1106. A seal 1107 is utilized between lock nut 1106 and fitting 1108. The tapered configuration of the end of lock nut 1106 forms a wedge that compresses flexible seal 1107 whereby the leakage of air is prevented. The shank 1112 of needle valve 1105 includes a conical point 1116 which conforms with the conical shape of orifice 1115.

It will be understood that the diaphragm chamber 963 may be adapted to apply the present invention to other types of relay emergency valves. For example, chamber 1060 could be pressurized to cause rod 926 to actuate a valve upon extension rather than by retraction. Such actuation of valve 920 could also be accomplished hydraulically, by electric or magnetic forces, or stored potential energy devices. The apparatus of the present invention may be used in single, auxiliary, emergency, or combinations thereof.

While the form of embodiment of the present invention as herein disclosed constitutes a preferred form, it is to be understood that other forms might be adopted, all coming within the scope of the claims which follow.

I claim:

1. A relay emergency valve mechanism for a brake system of the type that includes a service fluid reservoir and a brake motor, said mechanism comprising, in combination, casing means including a sealed chamber; a first passage for conducting a flow of pressurized fluid from said service fluid reservoir to said motor; a service valve means in said first passage including inlet and exhaust valves; a pressure responsive movable member connected to said valve means and exposed to fluid in said chamber whereby a decrease of pressure in said chamber closes the inlet valve of said service valve means and terminates the flow of fluid through said first passage; a second passage connected to said first passage for conducting fluid from said reservoir to said motor; an emergency valve means for normally obstructing the flow of fluid through said second passage and permitting flow in said first passage; means forming a second sealed chamber; a second pressure responsive movable member connected to said emergency valve means and exposed to pressurized fluid in said second sealed chamber whereby a change of pressure in said second sealed chamber opens said emergency valve means; means forming a third chamber; an actuating means including a rod extended through said casing means for overriding and closing said emergency valve means to terminate said emergency flow of fluid to said motor, said actuating means including a pressure responsive member exposed to the pressure in said third chamber; and a third valve means in said first passage, said third valve means being normally open and connected to said actuating means whereby operation of said second actuating means closes said third valve means.

2. A relay emergency valve mechanism for a brake system of the type that includes a service fluid reservoir and a brake motor, said mechanism comprising, in combination, casing means including a sealed chamber including inlet and exhaust valves, said sealed chamber including a pressure responsive movable member; a first passage for conducting a flow of pressurized fluid from said service fluid reservoir to said motor; a service valve means in said passage, said pressure responsive movable member being connected to said valve means and exposed to fluid in said chamber whereby a decrease of pressure in said chamber closes the inlet valve of said service valve means and terminates the flow of fluid through said passage; a second passage connected to said first passage for conducting fluid from said reservoir to said motor; an emergency valve means for normally obstructing the flow of fluid through said second passage and permitting flow in said first passage; means forming a second sealed chamber; a second pressure responsive movable member connected to said emergency valve means and exposed to pressurized fluid in said second sealed chamber whereby a change of pressure in said second sealed chamber opens said emergency valve means; means forming a third sealed chamber; a third pressure responsive movable member including a rod extended through said casing means and connected to said emergency valve means, said member being exposed to pressure in said third sealed chamber whereby a change of pressure in said third sealed chamber closes and overrides said emergency valve means; and a third valve means in said first passage, said third valve means being normally open and operatively connected to said third pressure responsive member whereby operation of said third pressure responsive member closes said third valve means.

3. A relay emergency valve mechanism for a brake system of the type that includes a tractor service fluid reservoir, a trailer service fluid reservoir, and a trailer brake motor, said mechanism comprising, in combination, casing means including a sealed chamber, said sealed chamber including a pressure responsive movable member; a first passage for conducting a flow of pressurized fluid from said trailer service fluid reservoir to said motor; a service valve means in said passage, said pressure responsive movable member being connected to said valve means whereby a decrease of pressure in said chamber closes said service valve means and terminates the flow of fluid through said passage; a second passage for conducting fluid from said trailer reservoir to said motor; an emergency system including an emergency valve means for normally obstructing the flow of fluid through said second passage; an actuating means for opening said emergency valve means to release an emergency flow of fluid from said trailers service fluid reservoir through said second passage to said motor; a third passage means connecting said sealed chamber with said tractor service fluid reservoir, an overriding means for closing said emergency valve means to terminate said emergency flow of fluid to said motor; a second emergency valve means for releasing pressurized fluid from said emergency system to said motor, said overriding means being operatively responsive to opening of said second emergency valve means; and an adjustable throttle valve in said second passage for controlling the rate of flow of fluid through said second passage when said first emergency valve means is open.

4. A relay emergency valve mechanism for a brake system of the type that includes a tractor service fluid reservoir, a trailer service fluid reservoir, and a trailer brake motor, said mechanism comprising, in combination, casing means including a sealed chamber; a first passage for conducting a flow of pressurized fluid from said trailer service fluid reservoir to said motor; a service valve means in said passage; a pressure responsive movable member connected to said valve means and exposed to fluid in said chamber whereby a decrease of pressure in said chamber closes said service valve means and terminates the flow of fluid through said passage; a second passage for conducting fluid from said trailer reservoir to said motor; an emergency valve means for normally obstructing the flow of fluid through said second passage; means forming a second sealed chamber; a second pressure responsive movable member connected to said emergency valve means and exposed to pressurized fluid in said second sealed chamber whereby a change of pressure in said second sealed chamber opens said emergency valve means; means forming a third sealed chamber; a third pressure responsive movable member connected to said emergency valve means and exposed to pressure in said third sealed chamber whereby a change of pressure in said third sealed chamber closes said emergency valve means; a third passage means connecting said first sealed chamber with said tractor service fluid reservoir; and a third valve means for said first passage, said third valve means being normally open and operatively connected to said third pressure responsive member whereby operation of said third actuating means closes said third valve means.

5. A relay emergency valve mechanism for an emergency brake system of the type that includes a service fluid reservoir, an emergency fluid reservoir, and a brake motor, said mechanism comprising, in combination, casing means including a sealed chamber; a first passage for conducting a flow of pressurized fluid from said service fluid reservoir to said motor; a service valve means in said passage; a pressure responsive movable member connected to said valve means and exposed to fluid in said chamber whereby a decrease of pressure in said chamber closes said service valve means and terminates the flow of fluid through said passage; a second passage for conducting fluid from said reservoir to said motor; an emergency valve means for normally obstructing the flow of fluid through said second passage; a first actuating means for opening said emergency valve means to release an emergency flow of fluid from said service fluid reservoir through said second passage to said motor; a second actuating means for closing said emergency valve means to terminate said emergency flow of fluid to said motor; and a second emergency valve means for releasing pressurized fluid from said emergency reservoir to said motor, said second actuating means being operatively responsive to opening of said second emergency valve means.

6. A relay emergency valve mechanism for an emergency brake system of the type that includes a service fluid reservoir, an emergency fluid reservoir, and a brake motor, said mechanism comprising, in combination, casing means including a sealed chamber; a first passage for conducting a flow of pressurized fluid from said service fluid reservoir to said motor; a service valve means in said passage; a pressure responsive movable member connected to said valve means and exposed to fluid in said chamber whereby a decrease of pressure in said chamber closes said service valve means and terminates the flow of fluid through said passage; a second passage for conducting fluid from said reservoir to said motor; an emergency valve means for normally obstructing the flow of fluid through said second passage; a first actuating means for opening said emergency valve means to release an emergency flow of fluid from said service fluid reservoir through said second passage to said motor; a second actuating means for closing said emergency valve means to terminate said emergency flow of fluid to said motor; a third valve means for said first conduit, said third valve means being normally open and connected to said second actuating means whereby operation of said second actuating means closes said third valve means; and a second emergency valve means for releasing pressurized fluid from said emergency reservoir to said motor, said second actuating means being operatively responsive to opening of said second emergency valve means.

7. A relay emergency valve mechanism for an emergency brake system of the type that includes a service fluid reservoir, an emergency fluid reservoir, and a brake motor, said mechanism comprising, in combination, casing means including a sealed chamber; a first passage for conducting a flow of pressurized fluid from said service fluid reservoir to said motor; a service valve means in said first passage; a pressure responsive movable member connected to said valve means and exposed to fluid in said chamber whereby a decrease of pressure in said chamber closes said service valve means and terminates the flow of fluid through said first passage; a second passage for conducting fluid from said service fluid reservoir to said motor; an emergency valve means for normally obstructing the flow of fluid through said second passage; means forming a second sealed chamber; a second pressure responsive movable member connected to said emergency valve means and exposed to pressurized fluid in said second sealed chamber whereby a change of pressure in said second sealed chamber opens said emergency valve means; an actuating means for closing said emergency valve means to terminate said emergency flow of fluid to said motor; a third valve means for said first passage, said third valve means being normally open when said emergency valve means is closed and connected to said actuating means whereby operation of said actuating means to close said emergency valve means opens said third valve means; and a second emergency valve means for releasing pressurized fluid from said emergency reservoir, said actuating means being operatively responsive to opening of said second emergency valve means.

8. A relay emergency valve mechanism for an emergency brake system of the type that includes a service fluid reservoir, an emergency fluid reservoir, and a brake motor, said mechanism comprising, in combination, casing means including a sealed chamber; a first passage for conducting a flow of pressurized fluid from said service fluid reservoir to said motor; a service valve means in said passage; a pressure responsive movable member connected to said valve means and exposed to fluid in said chamber whereby a decrease of pressure in said chamber closes said service valve means and terminates the flow of fluid through said passage; a second passage for conducting fluid from said reservoir to said motor; an emergency valve means for normally obstructing the flow of fluid through said second passage; means forming a second sealed chamber; a second pressure responsive movable member connected to said emergency valve means and exposed to pressurized fluid in said second sealed chamber whereby a change of pressure in said second sealed chamber opens said emergency valve means; means forming a third sealed chamber; a third pressure responsive movable member connected to said emergency valve means and exposed to pressure in said third sealed chamber whereby a change of pressure in said third sealed chamber closes said emergency valve means; a third valve means for said first conduit, said third valve means being normally open and operatively connected to said third pressure responsive member; conduit means connecting said third sealed chamber with said emergency reservoir; and a second emergency valve means for said conduit means, opening of said second emergency valve serving to release pressurized fluid to said third sealed chamber.

9. A relay emergency valve mechanism for a brake system of the type that includes a service fluid reservoir and a brake motor, said mechanism comprising, in combination, casing means including a sealed chamber, said sealed chamber including a pressure responsive movable member; a first passage for conducting a flow of pressurized fluid from said service fluid reservoir to said motor; a service valve means in said first passage including inlet and exhaust valves, said pressure responsive movable member being connected to said valve means whereby a decrease of pressure in said chamber closes the inlet valve of said service valve means and terminates the flow of fluid through said first passage; a second passage connected to said first passage for conducting fluid from said reservoir to said motor; an emergency valve means for normally obstructing the flow of fluid through said second passage and permitting flow in said first passage; a first actuating means for operating said emergency valve means to release an emergency flow of fluid from said service fluid reservoir through said second passage to said motor and for closing said first passage; an emergency valve actuating member extended through a wall of said casing means and including an inner end connected to said emergency valve means and an outer end; a power means connected to the outer end of said emergency valve actuating member; and a third valve means in said first passage, said third valve means being normally open and connected to said emergency valve actuating member whereby operation of said power means overrides said emergency valve means and closes said third valve means.

References Cited in the file of this patent
UNITED STATES PATENTS

| | | |
|---|---|---|
| 1,797,431 | Mathieson | Mar. 24, 1931 |
| 2,168,748 | Leukhardt | Aug. 8, 1939 |
| 2,219,786 | Olley | Oct. 29, 1940 |
| 2,367,115 | Goepfrich | Jan. 9, 1945 |
| 2,539,829 | Gomer | Jan. 30, 1951 |
| 2,723,164 | Burdick | Nov. 8, 1955 |
| 2,726,738 | Fawick | Dec. 13, 1955 |
| 2,772,926 | Fishwood et al. | Dec. 4, 1956 |
| 2,785,773 | Jeffrey et al. | Mar. 19, 1957 |
| 2,831,733 | Almond | Apr. 22, 1958 |
| 2,832,646 | Fites | Apr. 29, 1958 |